United States Patent
Craft et al.

(10) Patent No.: US 7,685,172 B2
(45) Date of Patent: Mar. 23, 2010

(54) IN-FLIGHT FILE DESCRIPTORS CHECKPOINT

(75) Inventors: David Jones Craft, Austin, TX (US); Vinit Jain, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/741,528

(22) Filed: Apr. 27, 2007

(65) Prior Publication Data

US 2008/0270422 A1    Oct. 30, 2008

(51) Int. Cl.
*G06F 17/30* (2006.01)

(52) U.S. Cl. ..................................... 707/202
(58) Field of Classification Search ............. 707/1, 707/100, 200–202, 2, 204
See application file for complete search history.

(56) References Cited

U.S. PATENT DOCUMENTS

| | | | |
|---|---|---|---|
| 6,766,471 B2 * | 7/2004 | Meth ........................... | 714/16 |
| 6,807,632 B1 * | 10/2004 | Carpentier et al. .......... | 713/165 |
| 7,076,555 B1 | 7/2006 | Orman et al. | |
| 7,443,878 B2 | 10/2008 | Hendel et al. | |
| 2005/0262411 A1 | 11/2005 | Vertes et al. | |
| 2006/0262716 A1 | 11/2006 | Ramaiah et al. | |

FOREIGN PATENT DOCUMENTS

| | | |
|---|---|---|
| FR | 2 843 210 A1 | 2/2004 |
| FR | 2 872 605 A1 | 1/2006 |
| WO | WO2004015513 A2 | 2/2004 |
| WO | WO2006010812 A3 | 2/2006 |

OTHER PUBLICATIONS

"Ejasent Announces Persistent Connection Migration Product", Grid Today, pp. 1-2, retrieved Apr. 9, 2007 http://www.gridtoday.com/03/1027/102176.html.
Butler et al., "Monitoring Abnormal Process Termination in Multi-Process Systems", IBM Technical Disclosure Bulletin, Jul. 1995, vol. 38, No. 7, pp. 359-360.

* cited by examiner

*Primary Examiner*—Cheryl Lewis
(74) *Attorney, Agent, or Firm*—Yee & Associates, P.C.; Matthew W. Baca

(57) ABSTRACT

A computer implemented method, data processing system, and computer program product for enabling the restoration of in-flight file descriptors during a checkpoint operation. Responsive to a checkpoint operation being initiated on a process in a workload partition, in-flight file pointers in an in-flight file queue on a socket bound to the process are identified. A file descriptor is instantiated in the process file table of the process for each identified in-flight file pointer in the in-flight file queue. After completion of the checkpoint operation, the in-flight file queue on the socket may be reconstructed in a restore operation using the instantiated file descriptors.

20 Claims, 3 Drawing Sheets

IN-FLIGHT FILE DESCRIPTORS CHECKPOINT

BACKGROUND OF THE INVENTION

1. Field of the Invention

The present invention relates generally to an improved data processing system, and in particular to a computer implemented method, data processing system, and computer program product for enabling the restoration of in-flight file descriptors during a checkpoint operation.

2. Description of the Related Art

Most data processing systems use data integrity operations for ensuring that the state of data in memory may be recreated in the event of a failure. A checkpoint operation is a data integrity operation in which the application state and memory contents for an application are written to stable storage at particular time points, i.e., checkpoints, in order to provide a basis upon which to recreate the state of an application in the event of a failure. For example, during a typical checkpoint operation, an application's state and data are saved onto a network disk at various predefined points in time. When a failure occurs, a restart operation may be performed to roll back the state of the application to the last checkpoint, such that the application data may be restored from the values stored on the network disk.

When a checkpoint operation has completed, sockets may be restored along with the data on these sockets. A UNIX domain socket is a socket used between processes on the same UNIX system. For UNIX domain sockets, it is possible that the data on these sockets contain in-flight file descriptors which are restored when the application is ready to read them. A file descriptor is a value used by a process to identify an open file. A file descriptor is the same mechanism that may process a read and write over a network because the file descriptor may point to a file on a disk, or point to a socket that is open in the kernel. A file descriptor table maintained by the kernel for each process translates the file descriptor to the open file or socket. A file descriptor entry in the file descriptor table includes a file pointer which references the location or address of the open file or socket.

A problem with current checkpointing and restore methods is that they do not handle or allow for restoration of these open files that are in-flight.

SUMMARY OF THE INVENTION

The illustrative embodiments provide a computer implemented method, data processing system, and computer program product for enabling the restoration of in-flight file descriptors during a checkpoint operation. Responsive to a checkpoint operation being initiated on a process in a workload partition, in-flight file pointers in an in-flight file queue on a socket bound to the process are identified. A file descriptor is instantiated in the process file table of the process for each identified in-flight file pointer in the in-flight file queue. After completion of the checkpoint operation, the in-flight file queue on the socket may be reconstructed in a restore operation using the instantiated file descriptors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
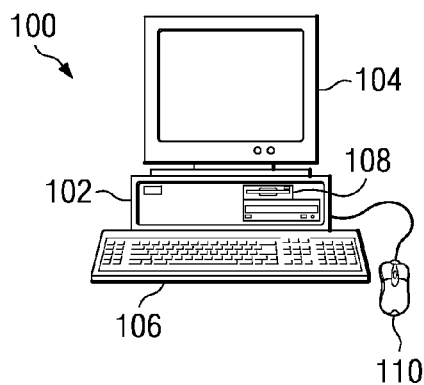
FIG. 1 depicts a pictorial representation of a data processing system in which the illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
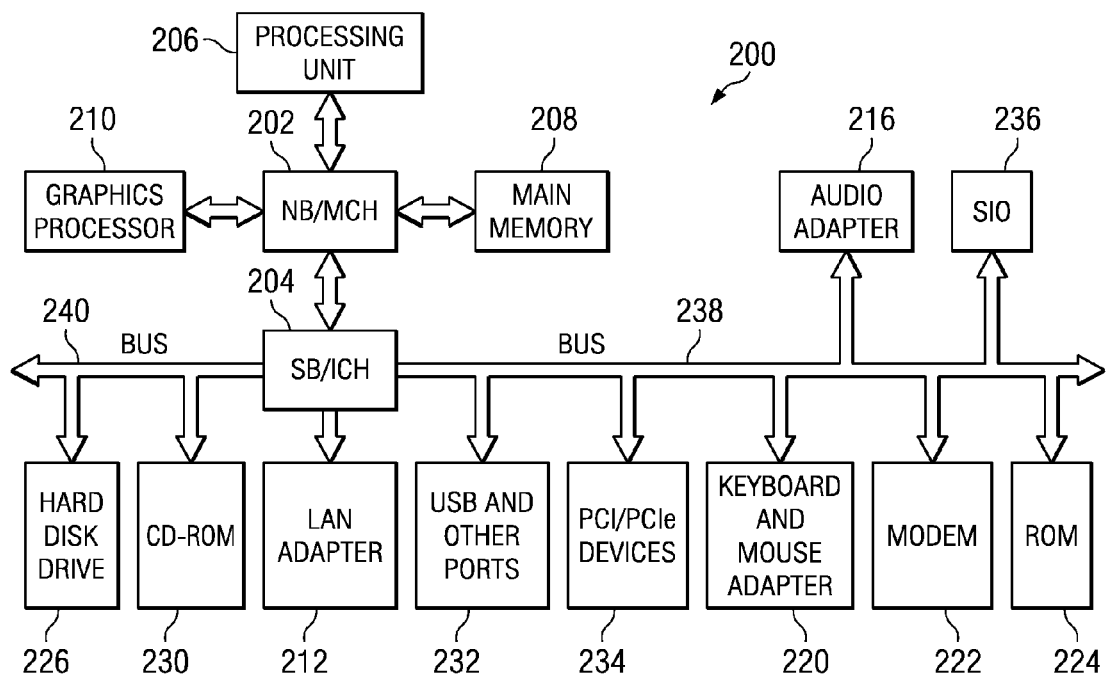
FIG. 2 is a block diagram of a data processing system in which the illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238.

Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method, data processing system, and computer program product for enabling the restoration of in-flight files during a checkpoint operation. The illustrative embodiments may be implemented using workload partitions, such as AIX® Workload Partitions (WPARs). WPAR is a product available from International Business Machines Corporation. A workload partition is a portion or representation of a system within an operating system. A workload partition is comprised of a group of processes, and the group of processes is not allowed to interact with other processes in other workload partitions.

When using UNIX domain sockets, a process (process A) may provide access to a file to another process (process B) by sending a file descriptor to the other process. When a file descriptor being sent to another process is between the processes, that file descriptor is deemed "in-flight". Process A's socket converts the file descriptor to a file pointer, and the file pointer is sent to process B's socket. Process B's socket then converts the file pointer to a file descriptor to allow process B to read and write to the file using the file descriptor.

With the illustrative embodiments, in-flight file descriptors of a process (e.g., process B) in a workload partition being checkpointed may be instantiated as file descriptors in the process space of the workload partition during the checkpoint. The in-flight file queue on the UNIX domain socket may then be reconstructed during the restore operation using those file descriptors in the process space. For example, when a file pointer to a file is sitting in process B's socket queue, a checkpoint of process B occurs. The illustrative embodiments provide a special Application Programming Interface (API) to the checkpoint code executed by the kernel which allows for identifying the file pointer sitting in the socket queue. The checkpoint code may then convert the file pointer to a file descriptor in the process space of that process. These file descriptors are stored in a process file table along with other open files for the process. The process file table is a file table that may be located within the application being checkpointed. The special API also returns information to the checkpoint comprising the file pointer (an address) and the file descriptor number, and this information is stored in the state information of the process to be used later to restore the file pointer queued on the socket. Current checkpoint operations have the ability to save the file table and, if the process already has the file descriptor, to recreate the file descriptor at a later time. The conversion of the file pointer to a file descriptor while the process is being checkpointed provides the checkpoint operation with enough data to enable the checkpoint operation to save the state for that file in the process file table.

Now that the file table with these instantiated file descriptors has been saved, the instantiated file descriptors are closed to remove their visibility in the namespace of the checkpointed process.

During the restart of process B on another machine or the same machine, process B is recreated and special restore code is inserted into process B. By this time, the process file table has been restored and it already has a file descriptor for the in-flight file. This special code has the file descriptor pair saved in the checkpoint operation. The special code makes a special call to the API to update the old file pointer with the new file pointer. The special code uses the file descriptor to determine the new file pointer for that file and updates the old file pointer queued in the socket with the new file pointer. The file descriptor for the in-flight file is then closed in the process file table, which leaves the process file table in a state just like it was before the checkpoint. This update is performed due to the fact that although the socket for process B is restored, the restored socket contains the old file pointer, which now is meaningless if process B is restarted on a different system. The call to the API allows the kernel to overwrite the old file pointer in the socket with the new file pointer. As the new pointer is already created on the new system by the special restore code using the saved information, the new file pointer is a faithful reproduction of how the file looked like prior to the checkpoint operation.

When process B is restarted, process B is at the same state prior to the checkpoint operation (i.e., the socket has a valid file pointer which points to a valid file needed by process B). When process B performs a receive operation, process B may read the file descriptor converted from the valid file pointer by the socket, thereby allowing process B to read and write to the file.

Figure 3:
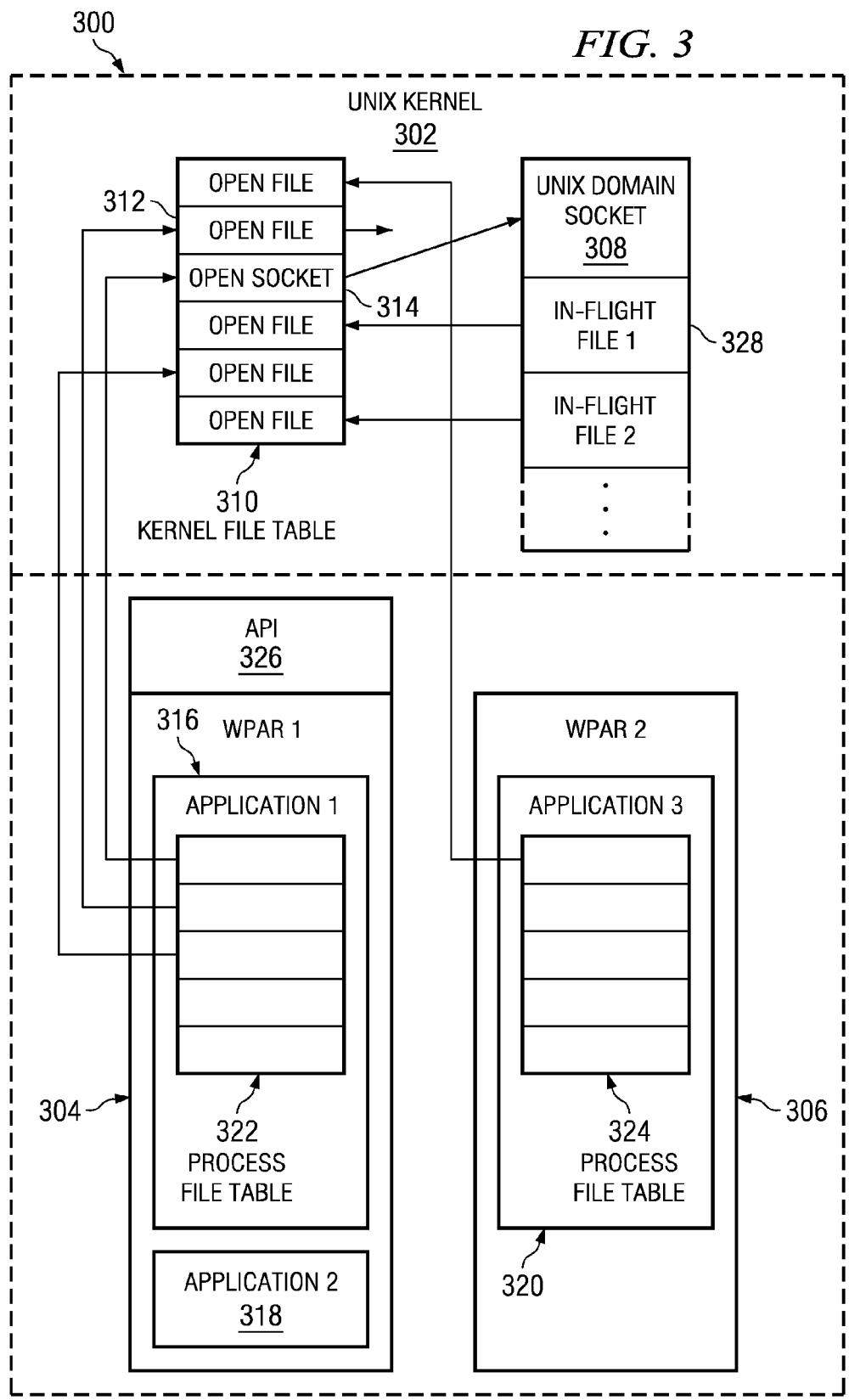
FIG. 3 is a block diagram of exemplary components with which the illustrative embodiments may be implemented.

FIG. 3 is a block diagram of exemplary components with which the illustrative embodiments may be implemented. Data processing system 300 may be implemented in, for example, data processing system 200 in FIG. 2. Data processing system 300 includes workload partitions UNIX kernel 302, WPAR 1 304, and WPAR 2 306.

UNIX kernel 302 includes sockets which allows for communicating between processes. In this illustrative example, UNIX kernel 302 comprises UNIX domain socket 308, which is a unique type of socket. UNIX domain sockets exist in all UNIX operating systems and allow two processes to communicate with each other on the same system (machine). With UNIX domain sockets, open files may be provided to other processes as data on the socket. For example, when a file on the file system is opened, a file descriptor of that open file may be sent to another process. Once the other process receives the file descriptor, that process may start writing to the same file without opening the file. The file descriptor sent to the other process provides a reference or file pointer to the open file.

UNIX kernel 302 also includes kernel file table 310. Kernel file table 310 comprises entries which indicate the open files in the file system (e.g., open file 312), as well as the sockets (e.g., open socket 314).

WPAR 1 304 is shown to contain two applications, application 1 316 and application 2 318, and WPAR 2 306 is shown to contain application 3 320. Each application may comprise a file table, such as process file tables 322 and 324, which contains the file descriptor information needed to operate (read/write) on open files For instance, two processes in WPAR 1 304 may be communicating with each other when a checkpoint operation is initiated on WPAR 1 304 while file descriptor references are being sent, or "in-flight", between the processes. Thus, a process in application 2 318 may send a file descriptor to a process in application 1 316, and before the process in application 1 316 has a chance to accept or read the file descriptor, the checkpoint operation starts and all activity on WPAR 1 304 is frozen. In this scenario, the in-flight file pointer sits in the queue of UNIX domain socket 308 during the checkpoint, waiting to be read. Since the checkpoint operation may restart the process on another system, the pointer to the file is not useful at this point since the pointer is no longer valid. The linkage needs to be re-established when the process is started on the new system.

To allow for re-establishing the linkages after a checkpoint operation is performed, special checkpoint code is inserted into the address space of the process in application 1 316 during the checkpoint operation. This special checkpoint code is executed as part of the process and allows for saving the original state of the process. The special checkpoint code saves the state of the process by making a call to API 326, which determines if there are any in-flight file pointers queued on UNIX domain socket 308 that are open on the process. If UNIX domain sockets 308 are open on the process, API 326 takes the in-flight file pointers on the socket queue, such as in-flight file 1 328, and instantiates them into file descriptors. The instantiated file descriptor is the result of what would have happened if the process on application 1 316 had actually received the file descriptor from application 2 318 and processed it (enabling the process to read and write to the open file using the file descriptor). When API 326 creates the file descriptor, API 326 returns the information as a file descriptor pair comprising the file pointer and the instantiated file descriptor for the open file to the special checkpoint code in the process to application 1 316. The file pointer is the address which references the location of the open file. The file descriptor pair information is stored as part of the state of the process to be used for restoration later. Once the checkpoint is complete, the file descriptors created for the in-flight file pointers are closed so that the file descriptors are no longer visible in the namespace of the process being checkpointed.

During the restore operation of the process, the file descriptors instantiated and saved for the in-flight files may be restored like any other file descriptors are restored in the process namespace. Special restore code is inserted into the address space of the restarted process. The special restore code makes a special call to API 326, which finds out the new file pointer using the file descriptor information saved during the checkpoint. This file descriptor information is used to overwrite the old file pointer (in-flight file 1 pointers 328) with the new file pointer stored in file table 322. Consequently, the queue of the in-flight file pointers on UNIX domain socket 328 is patched with the new file descriptor pair information.

After the restore is complete, the file descriptors within file table 322 are closed, so that the only reference to an open file is now in the queue of UNIX domain socket 328 (i.e., as before the checkpoint operation occurred).

When the process reads the UNIX domain socket, the valid in-flight file pointers are then converted to file descriptors. The process is then able to read or write to the files using the in-flight file descriptors received.

Figure 4:
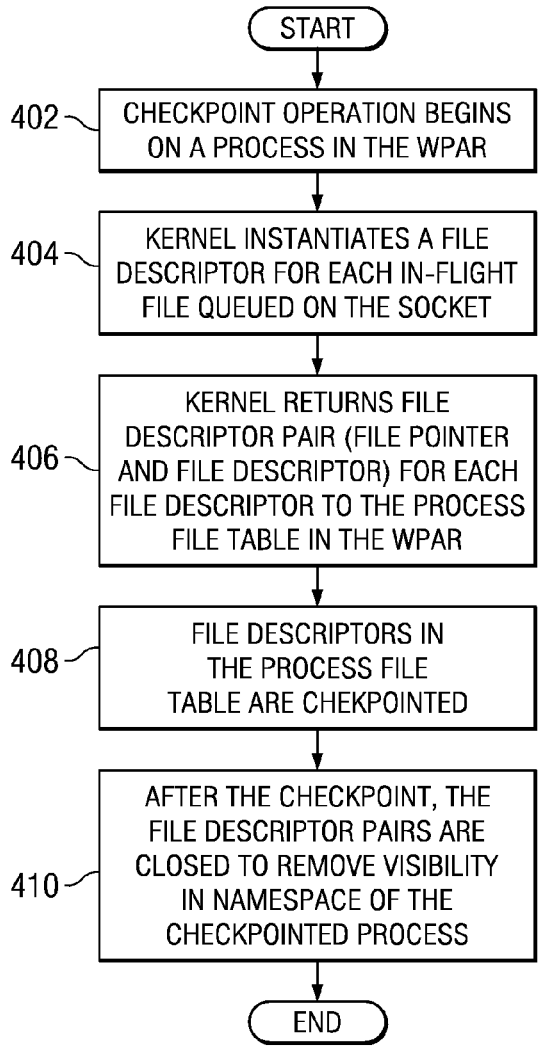
FIG. 4 is a flowchart illustrating a process during a checkpoint operation for enabling the restore of in-flight file descriptors in accordance with the illustrative embodiments.

FIG. 4 is a flowchart illustrating a process during a checkpoint operation for enabling the restore of in-flight file descriptors in accordance with the illustrative embodiments. The process described in FIG. 4 may be implemented in data processing system 300 in FIG. 3.

The process begins when a checkpoint operation is initiated on a process in a workload partition (step 402). In response to the checkpoint operation, special checkpoint code inserted into the process instantiates a file descriptor for each in-flight file pointer queued on the socket (step 404). The kernel returns a file descriptor pair for each file descriptor to the process file table in the workload partition (step 406). The file descriptor pair comprises the instantiated file descriptor and the file pointer for the in-flight file.

The file descriptors in the process file table are then checkpointed (step 408). Once the checkpoint of the process file table is complete, the file descriptor pairs in the process file table are closed to remove visibility in the namespace of the checkpointed process (step 410), with the process terminating thereafter.

Figure 5:
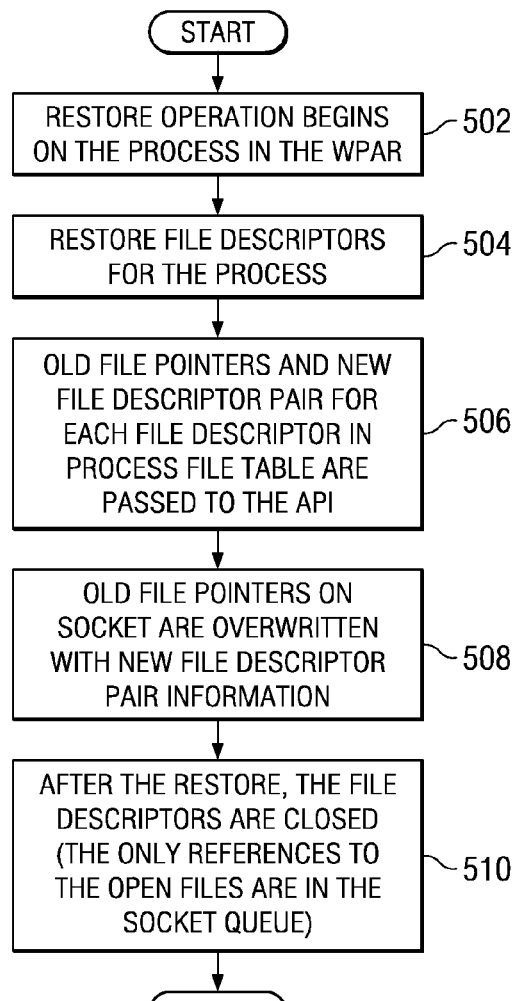
FIG. 5 is a flowchart illustrating a process during a restore operation for enabling the restore of in-flight file descriptors in accordance with the illustrative embodiments.

FIG. 5 is a flowchart illustrating a process during a restore operation for enabling the restore of in-flight file descriptors in accordance with the illustrative embodiments. The process described in FIG. 5 may be implemented in data processing system 300 in FIG. 3.

The process begins when the restore operation is initiated on the checkpointed process in the workload partition (step 502). The file descriptors for the process saved by the special checkpoint code in FIG. 4 are then restored (step 504). The file descriptors are restored as part of the restoration of the process file table. The special restore code makes a call to the special API and passes the restored file descriptor and the old file pointers (key) to this API (step 506).

This special code uses the restored file descriptor to lookup the new file pointer. The information comprising of an old file pointer paired with a new file pointer is then used to overwrite the old file pointer in the UNIX domain socket with the new file pointer (step 508). The special code may use the old pointer to determine which pointers in the UNIX domain socket should be overwritten with the new pointer information.

Once the restore is complete, the file descriptors in the process file table are closed (step 510), with the process terminating thereafter. Consequently, the socket queue is now the only place where references to open files exist.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for restoring in-flight file descriptors during a checkpoint operation, the computer implemented method comprising:

responsive to a checkpoint operation being initiated on a process in a workload partition, identifying in-flight file pointers in an in-flight file queue on a socket bound to the process;

instantiating a file descriptor in the process file table of the process for each identified in-flight file pointer in the in-flight file queue; and responsive to completion of the checkpoint operation, reconstructing the in-flight file queue on the socket in a restore operation using the instantiated file descriptors.

2. The computer implemented method of claim 1, wherein identifying in-flight file pointers in a queue of the socket further comprises:

making a call to an application programming interface to determine if any in-flight file pointers are queued on the socket.

3. The computer implemented method of claim 2, wherein the application programming interface instantiates the identified in-flight file pointers into instantiated file descriptors in the process file table of the process.

4. The computer implemented method of claim 1, wherein instantiating the identified in-flight file pointers into instantiated file descriptors further comprises:

returning a file descriptor pair for each instantiated file descriptor to the process file table in the workload partition;

checkpointing each instantiated file descriptor in the process file table; and responsive to completion of the checkpoint operation on the process file table, closing the file descriptor in the process file table.

5. The computer implemented method of claim 4, wherein the file descriptor pair comprises the instantiated file descriptor and a new file pointer for an in-flight file.

6. The computer implemented method of claim 4, wherein the file descriptor pair is stored in a state information of the process.

7. The computer implemented method of claim 6, wherein the file descriptor pair is used to reconstruct the identified in-flight file pointers queued on the socket.

8. The computer implemented method of claim 4, wherein reconstructing the in-flight file queue on the socket further comprises:

making a call to an application programming interface and passing the file descriptor pairs and identified in-flight file pointers to the application programming interface; and overwriting the identified in-flight file pointers in a queue of the socket with new in-flight file pointers in the file descriptor pairs, wherein the socket converts the new in-flight file pointers into new file descriptors to allow the process to read and write to the in-flight file.

9. The computer implemented method of claim 1, further comprising:
responsive to reconstruction of the in-flight file queue on the socket, closing the new file descriptors in the process file table.

10. A data processing system for restoring in-flight file descriptors during a checkpoint operation, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to identify, in response to a checkpoint operation being initiated on a process in a workload partition, in-flight file pointers in an in-flight file queue on a socket bound to the process; instantiate a file descriptor in the process file table of the process for each identified in-flight file pointer in the queue; and reconstruct, in response to completion of the checkpoint operation, the in-flight file queue on the socket in a restore operation using the instantiated file descriptors.

11. The data processing system of claim 10, wherein the computer usable code to instantiate the identified in-flight file pointers into instantiated file descriptors further comprises computer usable code to return a file descriptor pair for each instantiated file descriptor to the process file table in the workload partition; checkpoint each instantiated file descriptor in the process file table; and close the file descriptor in the process file table responsive to completion of the checkpoint operation on the process file table.

12. A computer program product for restoring in-flight file descriptors during a checkpoint operation, the computer program product comprising:
a computer usable storage medium having computer usable program code stored thereon, the computer usable program code comprising:
computer usable program code for identifying, in response to a checkpoint operation being initiated on a process in a workload partition, in-flight file pointers in an in-flight file queue on a socket bound to the process;
computer usable program code for instantiating a file descriptor in the process file table of the process for each identified in-flight file pointer in the queue; and
computer usable program code for reconstructing, in response to completion of the checkpoint operation, the in-flight file queue on the socket in a restore operation using the instantiated file descriptors.

13. The computer program product of claim 12, wherein the computer usable program code for identifying in-flight file pointers in a queue of the socket further comprises:
computer usable program code for making a call to an application programming interface to determine if any in-flight file pointers are queued on the socket.

14. The computer program product of claim 13, wherein the application programming interface instantiates the identified in-flight file pointers into instantiated file descriptors in the process file table of the process.

15. The computer program product of claim 12, wherein the computer usable program code for instantiating the identified in-flight file pointers into instantiated file descriptors further comprises:
computer usable program code for returning a file descriptor pair for each instantiated file descriptor to the process file table in the workload partition;
computer usable program code for checkpointing each instantiated file descriptor in the process file table; and
computer usable program code for closing, in response to completion of the checkpoint operation on the process file table, the file descriptor in the process file table.

16. The computer program product of claim 15, wherein the file descriptor pair comprises the instantiated file descriptor and a new file pointer for an in-flight file.

17. The computer program product of claim 16, wherein the file descriptor pair is used to reconstruct the identified in-flight file pointers queued on the socket.

18. The computer program product of claim 15, wherein the file descriptor pair is stored in state information of the process.

19. The computer program product of claim 15, wherein the computer usable program code for reconstructing the in-flight file queue on the socket further comprises:
computer usable program code for making a call to an application programming interface and passing the file descriptor pairs and identified in-flight file pointers to the application programming interface; and
computer usable program code for overwriting the identified in-flight file pointers in a queue of the socket with new in-flight file pointers in the file descriptor pairs, wherein the socket converts the new in-flight file pointers into new file descriptors to allow the process to read and write to the in-flight file.

20. The computer program product of claim 12, further comprising:
computer usable program code for closing, in response to reconstruction of the in-flight file queue on the socket, the new file descriptors in the process file table.

* * * * *